July 3, 1956
R. ROSEBROOK
2,753,145
TRACER MECHANISM
Filed Aug. 2, 1952
3 Sheets-Sheet 1
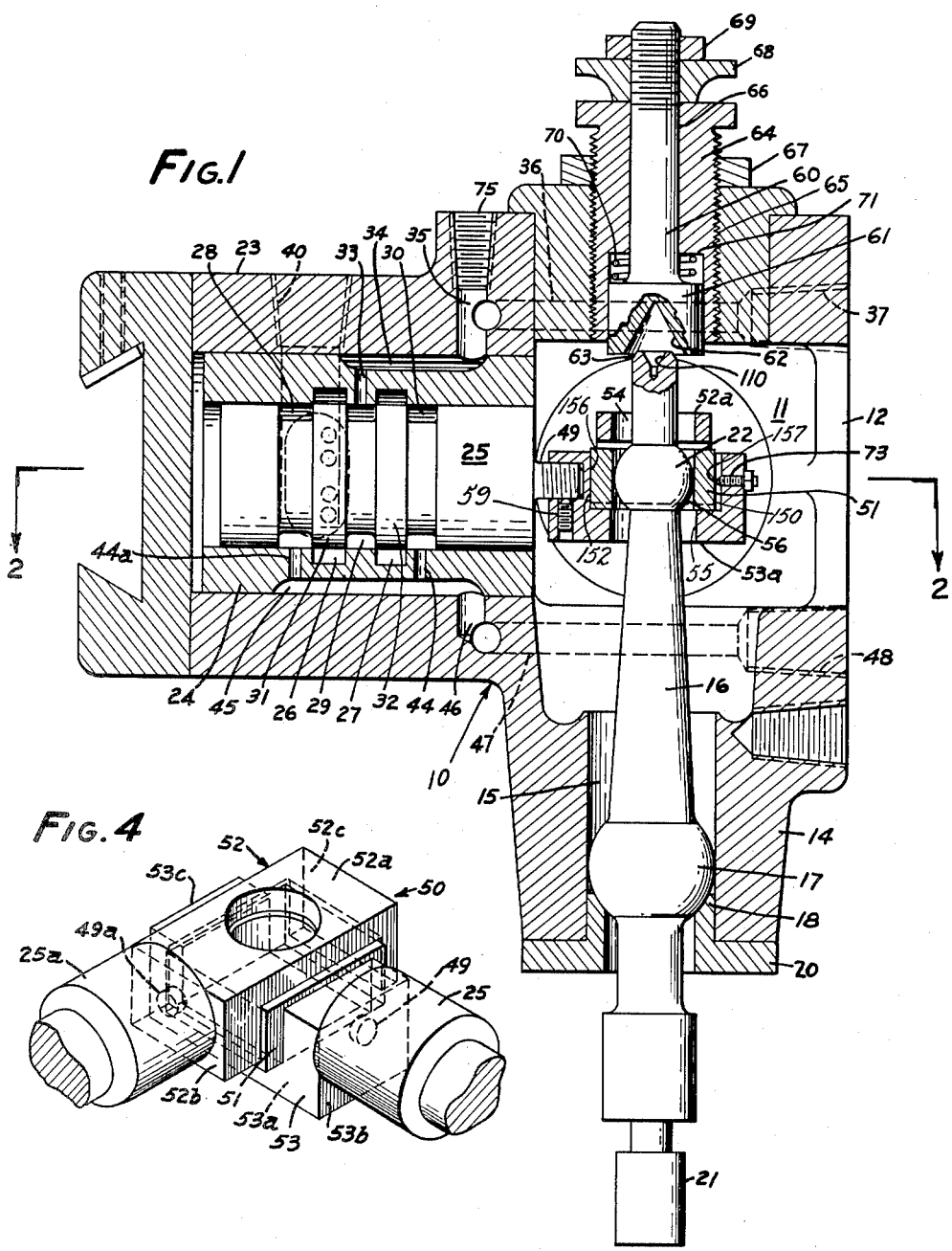
INVENTOR.
Roy Rosebrook
BY
D. Gordon Angus
ATTORNEY

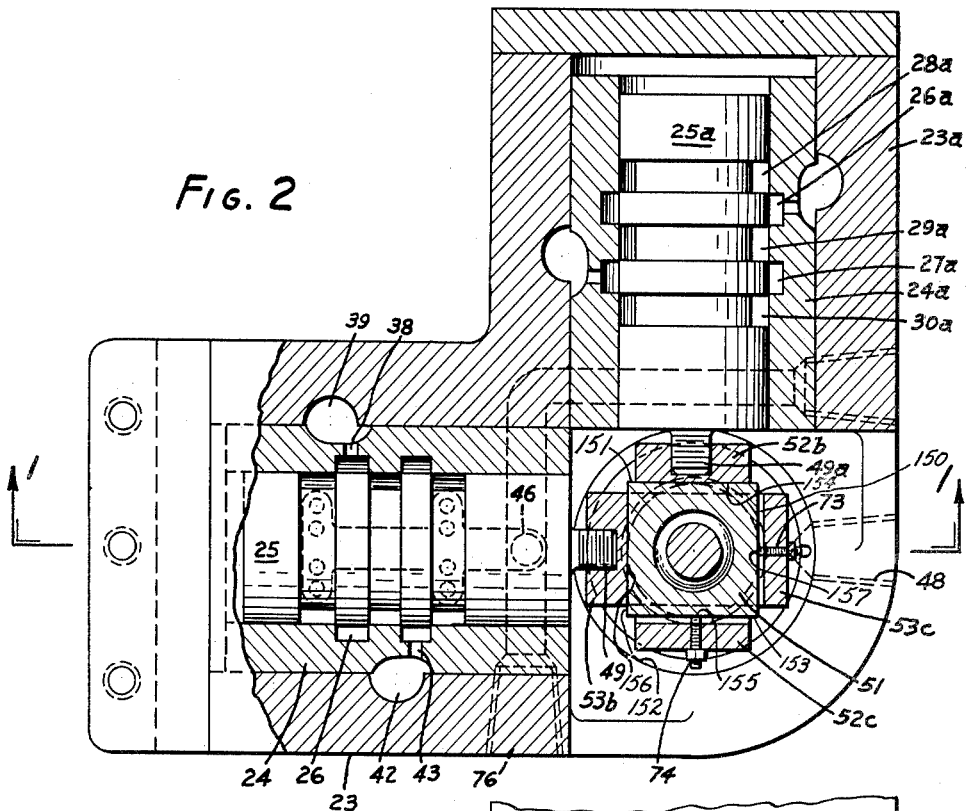
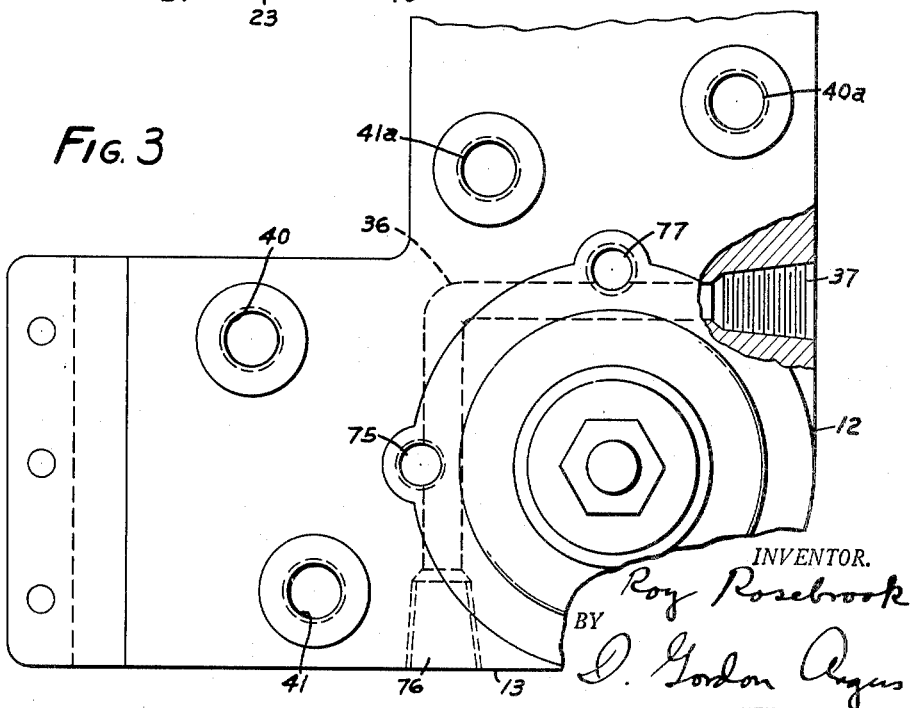

United States Patent Office 2,753,145
Patented July 3, 1956

2,753,145

TRACER MECHANISM

Roy Rosebrook, Monterey Park, Calif., assignor to True-Trace Corporation, El Monte, Calif., a corporation of California Application August 2, 1952, Serial No. 302,431

18 Claims. (Cl. 251—3)

This invention relates to tracer mechanisms and more particularly to a tracer mechanism adapted for use with hydraulically operated duplicating devices wherein the tracer hydraulically controls the movement of a machine tool such as a milling cutter or other cutting or shaping tool, for reproducing the shape of a template or pattern or the like.

An object of this invention is to provide a tracer mechanism which is relatively simple and inexpensive as compared to other tracer mechanisms and which is nevertheless extremely accurate in its operation.

A related object is to provide a novel and convenient form of rapid traverse mechanism associated with the tracer.

In Roehm Patent 2,332,532 there is shown a pattern control machine tool comprising a tracer mechanism having a rapid traverse feature located at an intermediate position of the tracer spindle.

In accordance with the present invention I provide a tracer mechanism responsive to the variations of shape of a pattern in all directions in a plane. In my tracer mechanism, the rapid traverse feature is preferably, although not necessarily, located at the top of the spindle, where it can be regulated by a convenient means at the top.

A feature of my device resides in means for mounting valve means to a tracer stylus whereby movement of the stylus is accurately transmitted to the valve means.

The foregoing and other features of my invention will be better understood from the following detailed description and the accompanying drawings of which:

Fig. 1 is an elevation view in cross-section taken at line 1—1 of Fig. 2, of a tracer mechanism according to this invention;

Fig. 2 is a view, partly in cross-section, taken at line 2—2 of Fig. 1;

Fig. 3 is a top view, partly in cutaway cross-section, of the mechanism;

Fig. 4 is an isometric view showing a constructional detail embodied in the mechanism.

Figure 5:
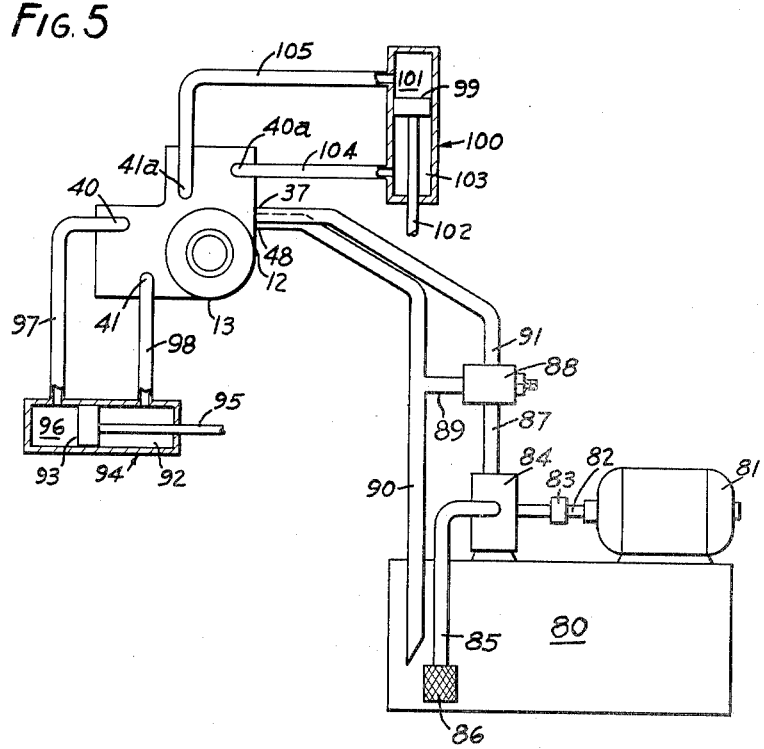
Fig. 5 illustrates in schematic form a system in which the tracer mechanism can be used.

Referring to the drawings, the device comprises a housing 10 containing a centrally located chamber 11 which is left open on two sides 12 and 13 for access to the internal mechanism. The lower portion of the housing has a depending neck portion 14 having a channel 15 leading out of the housing. There is axially located within the housing and channel 15 a tracer member 16 in the form of a pendulum type stem or stylus supported for universal movement by a ball-like member 17 integral with the stem of the tracer. The tracer is elongated on its own longitudinal axis. The longitudinal axis in the figures extends from end to end of the stylus. The lower side of this ball-like member 17 is supported by the frusto conical shoulder 18 of a collar member 20. At the lower end of the stylus 16 beneath the ball-like member 17 the stylus 16 extends downwardly to form an end portion 21 which extends beyond the housing and which is adapted to engage a pattern or template to be traced. Moving the lower portion of the stylus laterally relative to the longitudinal axis causes the ball-like element 17, which is laterally restrained, to act as a fulcrum and rotate. The stylus, of course, moves with the rotation of the ball-like element 17. The ball-like element 17 is supported so that the lower end of the stylus can be moved in any lateral direction; that is to say there is no restriction on the direction in which the lower portion of the stylus can swing. The surrounding structure, of course, limits the total swing of the stylus.

Above the ball-like member 17 there is formed on the stylus another ball-like member 22 which may conveniently be somewhat smaller than ball-like member 17. It will be convenient, although not necessary, for the distance from the center of ball-like member 17 to the center of ball-like member 22 to be equal to the distance from the center of ball-like member 17 to the bottom of the stylus 21. When such proportions are used, a given amount of movement imparted to the end 21 in any direction will result in exactly the same amount of movement of ball-like member 22 in exactly the opposite direction.

It will be appreciated that ball-like members 17 and 22 are both located along the longitudinal axis of the stylus. One of these two ball-like members is disposed between the end portion 21 of the stylus, and the other ball-like member. In the figures, ball-like member 17 is shown between the ball-like member 22 and the end portion 21 so that ball-like member 22 is on the opposite side of ball-like member 17 from the end portion 21.

At one side of chamber 11 there extends in a lateral direction a cylindrical portion 23 of the housing within which there is fitted a valve cylinder 24 which contains a spool type valve piston 25 adapted to be reciprocated by movement of ball-like member 22. The valve cylinder and valve piston together make up a piston valve, sometimes called a spool valve. The valve cylinder and piston are provided with suitable port arrangements to control the flow of a hydraulic fluid such as oil under pressure which is to be used to operate the cutting machine. The sleeve is provided with a pair of internal annular ports 26 and 27; and the piston 25 is provided with three external annular ports 28, 29 and 30, leaving the two collars 31 and 32 between the ports 28, 29 and 30. The width of the collars 31 and 32 in the direction of the piston axis is at least as great or the same as the width of the ports 26 and 27 so that when the piston is in its central position within the cylinder the collars 31 and 32 will cover the respective ports 26 and 27.

A passageway 33 connects the central port 29 of the piston with a chamber 34 recessed in the outer wall of cylinder 24 between it and the inner wall of portion 23; and this chamber 34 communicates through bores 35 and 36 with an internally threaded outlet opening 37 formed in the housing, to which a conduit or tubing (not shown) is adapted to be attached with a source of pressurized hydraulic fluid such as oil (not shown).

The port 26 is connected through a passageway or hole 38 (see Fig. 2) with a channel 39 formed by recessing the cylinder 24 and the housing 23; and channel 39 communicates with an internally threaded outlet 40 to which a suitable conduit or hose 97 (see Fig. 5) is adapted to be connected; and in accordance with well-known practice this hose will be connected to one side of the piston in the power cylinder 94 which is to drive the cutting machine (not shown). According to the well-known operation of such a cylinder the oil pressure entering the cylinder from outlet 40 of the valve will push the piston and force the hydraulic fluid from the cylinder at the opposite side of the piston. This fluid thus forced out of the cylinder will be carried through a conduit 98 which is fitted to the threaded fitting 41 which leads to channel 42 (see Fig. 2) formed in members 23 and 24 and thence through bore 43 to port 27. When port 29 opens to port 26, fluid under pressure at 37 is brought to holes 38 and 39 to outlet 40, from whence the fluid can be carried through a suitable conduit (not shown in Figs. 1 and 2) to a device such as a cylinder or a fluid motor. At the same time port 27 will be opened up to port 30; and the fluid will thereby be enabled to flow through hole 44 to space 45 formed in member 24, and thence through holes 46 and 47 to the threaded outlet 48 from whence it can flow back to a suitable storage tank 80 (see Fig. 5).

If the piston 25 moves to the right (Figs. 1 and 2) from the on center position, port 29 will be open to port 27, causing the fluid under pressure to flow from inlet opening 37 to holes 42 and 43 and out through opening 41 from whence a suitable conduit (not shown in Figs. 1 and 2) can carry it to a fluid motor or cylinder or the like. At the same time port 26 is opened to port 28 allowing return fluid to flow through a suitable conduit into threaded opening 40, through holes 39 and 38 to port 26; thence to port 28 to hole 44a, channel 45, holes 46 and 47 and exhaust outlet 48; from whence a conduit (not shown in Figs. 1 and 2) can return it to the fluid storage tank.

There extends laterally from the chamber 11 a housing portion 23a similar to the housing portion at 23 and the axis of housing portion 23a is perpendicular to the axis of housing 23. The portion 23a similarly contains a cylindrical valve member 24a similar to valve member 24 and a piston member 25a similar to the piston 25, the elements 23a, 24a, 25a, 26a, 27a, 28a, 29a and 30a corresponding respectively to elements 23, 24, 25, 26, 27, 28, 29 and 30.

There will be associated with the valve ports in housing 23a fluid outlets similar to those within housing 23; and this housing will have outlets 40a and 41a corresponding to outlets 40 and 41; and similar fluid conduits (not shown) will be carried to a similar fluid motor or cylinder for operation of the machine cutter in a similar manner.

In the manufacture of a housing of the character described involving the considerable number of drilled channels and holes it will be understood that some holes will have to be drilled for working purposes which will not be used; and these will be stopped up with plugs. Thus, plugs 75, 76 and 77 act as stoppers for holes which are only partially used.

The pistons 25 and 25a are coupled to the ball-like member 22 by being attached through respective stems 49 and 49a to a universal joint member 50 (see Fig. 4). This universal joint member comprises a rectangular block 51 in the form of a rectangular prism having exterior bearing surfaces 150, 151, 152 and 153 which may be planar, and which extend in the direction of desired reciprocation of the pistons. As shown in Fig. 2, the exterior bearing surfaces are provided in pairs, which pairs are perpendicular to each other. A central hole 56 through the block is aligned with the exterior bearing surfaces, and has the proper diameter so that the ball-like member 22 fits snugly within the side walls formed by the hole 56.

The universal joint also has bearing means comprising two U-shaped members 52 and 53 for retaining the block 51 in a bearing relationship. The U-shaped member 52 has a bight 52a, and a pair of legs 52b, 52c. U-shaped member 53 is similarly constructed, with a bight 53a, and a pair of legs 53b, 53c. Each of the legs has an interior bearing surface. Interior bearing surfaces 154 and 155 are on legs 52b and 52c, respectively, and interior bearing surfaces 156 and 157 are on legs 53b and 53c respectively. One of the interior bearing surfaces of each U-shaped member extends in the direction of desired piston reciprocation, in the direction of the adjacent exterior bearing surface of the block 51. Of course, the interior bearing surfaces of both legs of each member could be parallel to the bearing surfaces of the block.

However, preferably, although not necessarily the legs of the U-shaped members are spaced apart so that there is some clearance between the block and the interior bearing surfaces. This clearance is taken up by set screws 73 and 74, which can be provided with a lock nut for holding the adjustment. This arrangement gives a measure of adjustability which may be desired.

When the spacing of the legs is greater than the width of the block, and a set screw is used, the ends of the set screws may be considered an interior bearing surface of the leg to which the set screw is threaded. For example, in Fig. 2, interior bearing surfaces 155 and 157 are shown as disposed at the end of the set screws 73 in legs 52c and 53c respectively.

The U-shaped members are placed with the bights on opposite sides of the block 51, with the bights crossed with respect to each other, so that one leg of a U-shaped member is on each side of the block, with its interior bearing surface in bearing relationship with the adjacent exterior bearing surface of the block. The block is thereby enclosed by the U-shaped members.

The term "bearing relationship" as used herein denotes a relationship in which the adjacent exterior and interior bearing surfaces are restrained against relative lateral movement; that is, from getting closer to each other, but can move relative to each other in a parallel manner. A special case of this bearing relationship is shown in the drawings, where the adjacent bearing surfaces engage each other in sliding contact.

The bights of the U-shaped members 52a and 53a are provided with holes 54 and 55 respectively which are large enough to allow the stem 16 of the stylus to pass through with substantial clearance. These are aligned with hole 56 in the block.

It will now be seen that as the ball like member 17 rotates as a fulcrum, ball-like member 22 moves sidewise, and also rotates in the block 51, pressing against the sidewalls of hole 56. Block 51 can be moved laterally (left and right, Fig. 2) between legs 52b and 52c, and also laterally (upward and downward, Fig. 2) between legs 53b and 53c which are the directions of desired piston reciprocation.

Since piston 25 is rigidly attached to leg 53b (and held by a set screw 59); and piston 25a is rigidly secured to leg 52b where it is held by a similar set screw, any movement of the stylus about its pivot point at ball-like member 17 is translated to the pistons. Any horizontal component of movement of ball-like member 22 to the left or right (with reference to Figs. 1 and 2) correspondingly sends piston 25 to the left or right. Any component of movement of ball-like member 22 in the other horizontal direction (upward or downward with reference to Fig. 2) correspondingly sends piston 25a in the same direction and by the same amount.

In ordinary operation, the movement of the stylus 16 is a limited and gradual one corresponding with ordinary gradual variation of shape of a pattern. Under some circumstances, however, it is desired to be able to permit a rapid traverse or movement of the tool; for example, when it is desired to move the tool rapidly away from, or along, the work, as when the work is, or has been, removed from the machine, or when it is desired to return the tool to the starting end of its traverse path. At this time, it is desirable to be able to move the stylus beyond the limits established for ordinary operation, and open the spool valves wider so as to provide a faster traverse movement. For this purpose there is provided a means limiting or restricting the amount of permissible tilting movement of the stylus for ordinary operations but permitting a greater tilting movement of the stylus to provide a rapid traverse when desired. This device comprises a pin 60 axially aligned with the stylus 16 and having at its lower end a head 61 having formed within its bottom side a conical surface 62, the axis of the cone lying along the longitudinal axis of the stylus and pin. The upper end of the stylus 16 is somewhat similarly formed with a mating frusto-conical surface 63 the surface of which may conveniently be made parallel to the surface 62. The clearance between the surfaces 62 and 63 will determine the limit of movement permitted the stylus.

Figure 1A:
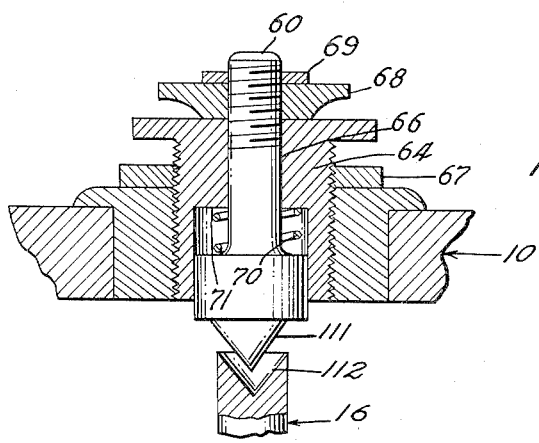
Fig. 1a is a fragmentary view, partly in cross-section, of another form of rapid traverse control for use with this tracer mechanism.

It will be appreciated that there are many pairs of surfaces other than frusto conical or conical which will accomplish this purpose. Such surfaces should be non-planar, and one should be concave and the other convex. Surfaces of revolution in general, and cones in particular, will usually be preferred, both for ease in manufacture and for simplicity in operation. As has just been indicated, this construction utilizes the clearance between conical surfaces 62 and 63 to provide the permissible degree of movement. It should be understood, however, that a convex surface of revolution such as cone 111 can be provided on the pin 60, and a similar, but concave, surface 112 can be formed at the end of the stylus, as shown in Fig. 1a. This arrangement of the two surfaces 111 and 112 is the opposite of that shown in Fig. 1, but the operation will be the same.

The pin 60 is slidably held within a guiding sleeve 64 which is threaded into an opening of the housing by threads 65; and the sleeve is provided with a suitable cylindrical opening 66 extending through it in the axial direction to permit the pin to slide within. A lock nut 67 will serve to fasten the sleeve in the desired position relative to the housing. The vertical height of the pin 60 in the sleeve will be dependent on the adjusting nut 68 which serves to raise or lower the pin; and a lock nut 69 will serve to hold the adjustment. At whatever adjustment is made, the pin will be urged in the downward direction by a compression spring 70 held between the top of the head 61 and a shoulder 71 of the sleeve.

The arrangement is such that in its normal position, the spring will urge the pin 60 downwardly so that the bottom of the adjusting nut rests against the top of the sleeve 64. The operator may, however, grasp the nut 68 and pull the pin upwardly through the sleeve against the compression of the spring so as to widen the gap between the conical surfaces 62 and 63. This widened gap will permit much greater movement or traverse of the stylus than would be permitted by conical surface 62 in its lowermost adjusted position.

The operation of the mechanism should be apparent from the foregoing description. The tracer mechanism is ordinarily attached to a machine tool so as to move in the same direction and the same distance relative to the work as the cutting tool. This is frequently accomplished by mounting the tracer mechanism to the tool support. The end portion 21 of the stylus is traced along the pattern, so that the stylus maintains contact with the pattern surface and moves accordingly in the lateral direction so that there may be components of motion of ball-like member 22 in any lateral direction; and the setting of the cone 62 of head 61 above the conical surface 63 will be normally sufficient to allow for ordinary movements. The spool pistons 25 and 25a will undergo the lateral components of movement of ball-like member 22 in the directions of their respective axes. The term lateral refers to movement transverse to the longitudinal axis of the stylus, and not to any particular orientation of the tracer mechanism in space. If, for example, spool 25 is moved to the left off the center position shown in Fig. 2 it will allow port 29 to communicate with port 26 and also will allow port 27 to communicate with port 30. This will enable the hydraulic fluid under pressure to flow from port 29 into port 26 and out the conduit (not shown in Figs. 1 and 2) attached to opening 40 which will thus operate the corresponding piston of the fluid motor or operating cylinder (not shown in Figs. 1 and 2) in the same direction as the end portion 21 of the stylus was moved to cause the spool valve to open.

If, on the other hand, the ball-like member 22 moves to the right (Fig. 2) the fluid under pressure will flow from port 29 into port 27 and out channel 42 to outlet 41 from whence it will flow through the hose conduit (not shown) to the opposite side of the same power piston.

Movement of the ball-like member 22 so that it has a component of motion in the direction of the axis of spool piston 25a opens and closes respective ports in a manner similar to that of piston 25. This sends pressurized fluid to one side or the other of fluid motor or cylinder 100 (see Fig. 5) which is controlled by the valving associated with spool 25a.

Fig. 5 shows schematically a well-known system in which the tracer mechanism can be used; and this shows a manner of connecting conduits or hose couplings to the various outlets in the mechanism. The fluid, ordinarily oil, to be used for the hydraulic operation is contained in a fluid tank 80 on which may be mounted a suitable motor 81 provided with a shaft 82 coupled at 83 to the shaft of a pump 84, causing the pump to lift the fluid through a pipe 85 extending down to its opening near the bottom of the tank. Preferably a strainer 86 is provided at the entrance of the pipe. The fluid under pressure is carried through the pressure pipe 87 to a suitable relief valve 88. This relief valve can be of a well known type, having provision for returning to the tank from the valve through conduits 89 and 90 sufficient of the pumped fluid so as to maintain a constant pressure at the outlet pipe or conduit 91 from the pressure relief valve. Conduit 91, being connected with the high pressure opening 37 of the tracer valve housing, makes this high pressure fluid available to the pressure port 29 and 29a of the spool pistons, in the manner already explained above.

Thus, if piston 25 moves to the right (Figs. 1 and 2) from the on-center position, the high pressure fluid entering the housing through inlet opening 37 will pass through the valve ports and out through opening 41 and a conduit 98 to chamber 92 at one side of a movable piston 93 in a fluid cylinder 94. The stem 95 of the piston can be used to operate a cutting machine (not shown) with which the mechanism may be associated, in a well known manner. The pressure of the fluid in chamber 92 will move piston 93 to the left (Fig. 5), thereby expelling fluid in chamber 96 through a condit 97 into the opening 40 from where it passes through the channels of the housing into ports 26 and 28 and thence out the exhaust outlet at 48 and through the exhaust conduit 90 back to the tank. The pressure in chamber 92 of cylinder 94 continues to move piston 93 to the left (Fig. 5) until movement of stylus 21 by the pattern produces a movement of spool piston 25 to the left (Fig. 1), sufficient to shut off the fluid pressure from chamber 92. In the event spool piston 25 is moved far enough to the left to produce communication between ports 26 and 29, the direction of pressure flow will be reversed. That is, the fluid under pressure at inlet opening 37 will be brought to outlet 40 instead of outlet 41 so that the fluid under pressure will flow into chamber 96 of cylinder 94, thereby causing piston 93 to move to the right (Fig. 5). This movement will force fluid out of chamber 92 through conduit 98 and into the opening 41, and thence through the channels and ports to the exhaust outlet 48 and back through the exhaust pipe 90 to the tank 80.

Components of motion of the ball-like member 22 in the direction of the axis of spool piston 25a will operate the piston 99 in a fluid cylinder 100. Thus, movement of piston 25a in the downward direction (with reference to Fig. 2) will send the fluid under pressure at the pressure opening 37 through the channels and ports and out opening 41a to the chamber 101 of cylinder 100 thereby moving piston 99 and its rod 102 in the downward direction (with reference to Fig. 5); the fluid in chamber 103 being pushed through conduit 104 back into opening 40a through the channels and ports to the exhaust outlet 48 and thence to the tank. Likewise, movement of spool piston 25a off center in the upward direction (with reference to Fig. 3) will send the high pressure fluid from inlet 37 through the proper ports and channels to opening 40a and thence to chamber 103, to push piston 99 in the upward direction; the fluid thus pushed out of chamber 101 being sent through conduit 105 to opening 41a and thence through the channels and ports to exhaust opening 48. It will be apparent that the connections of conduits 97 and 98 to openings 40 and 41 may be switched to reverse the direction of piston movement for a given direction of spool movement. The same is true of the connections of conduits 104 and 105 to openings 40a and 41a.

In the foregoing manner it will be understood how components of movement in any horizontal direction of the protruding end portion 21 of the stylus produces corresponding movement of pistons 93 and 99 in the fluid cylinders, thereby enabling this motion to be used in any well known manner to produce corresponding movement in a machine tool.

It will be recognized that by the present invention there is provided a tracer mechanism of a relatively simple construction which can effectively control the operation of a machine tool in response to a pattern configuration. Furthermore, there is provided a simple and easily adjustable means for restricting the movement of the stylus while still permitting its rapid traverse when desired. The invention is not limited to the particular embodiments shown and described herein which are given by way of illustration rather than of limitation; and is only limited by the scope of the appended claims.

I claim:

1. In a pattern tracing mechanism of the type having a stylus mounted for universal movement within a housing and piston-operated valve means operable in response to movement of said stylus: means manually movable from one position to another for restraining the movement of said stylus in one position while permitting its rapid traverse in the other position, comprising a conical surface at the end of the stylus remote from the pattern, and a retractable pin means beyond said end and colinear with the axis of the stylus, said pin having a conical surface mating with the first-mentioned conical surface with clearance between said conical surfaces to establish the permissible movement of the stylus, and means for retracting the pin in a direction away from the stylus to increase the clearance and thereby allow rapid traverse.

2. Apparatus according to claim 1 wherein the means for retracting the pin comprises a spring between the housing and the pin, said spring being disposed inside the housing, and a rotatable member threadably engaged to the pin outside the housing and bearing against it, whereby turning of said rotatable member will shift the pin axially against the spring pressure.

3. In a pattern tracing mechanism of the type having a stylus with a longitudinal axis which stylus is mounted for universal movement within a housing and having piston-operated valve means operable in response to movement of said stylus, means manually movable from one position to another for restraining the movement of said stylus in one position while permitting its rapid traverse in the other position, comprising a non-planar surface at the top of the stylus, and a member located above the stylus having an axis colinear with said longitudinal axis, and having a mating non-planar surface spaced from the first-mentioned non-planar surface, to limit movement of the stylus.

4. Apparatus according to claim 3 in which the non-planar surfaces are surfaces of revolution.

5. In a pattern tracing mechanism of the type having a stylus mounted for universal movement within a housing and piston operated valve means operable in response to movement of said stylus: means manually movable from one position to another for restraining the movement of said stylus in one position while permitting its rapid traverse in the other position, comprising a conical surface on the stylus remote from the pattern, and a retractable pin means colinear with the axis of the stylus, said pin having a conical surface mating with the first-mentioned conical surface with clearance between said conical surfaces to establish the permissible movement of the stylus, and means for retracting the pin in a direction away from the conical surface on the stylus to increase the clearance and thereby allow rapid traverse.

6. In a pattern tracing mechanism of the type having a stylus with a longitudinal axis which stylus is mounted for universal movement within a housing and having piston-operated valve means operable in response to movement of said stylus, means manually moveable from one position to another for restraining the movement of said stylus in one position while permitting its rapid traverse in the other position, comprising a non-planar surface on the stylus, and a member having an axis colinear with said longitudinal axis, and having a mating non-planar surface spaced from the first-mentioned non-planar surface, to limit movement of the stylus.

7. Apparatus according to claim 6 in which the non-planar surfaces are surfaces of revolution.

8. Tracing mechanism mounted in a housing and adapted to reciprocate a pair of piston valves, said mechanism comprising a tracer stylus having a longitudinal axis and a ball-like member located at an intermediate position along said longitudinal axis, the stylus being mounted within the housing and having a portion extending beyond the housing, said portion being adapted to engage a pattern to be traced, means connected with the housing laterally restraining and supporting the ball-like member in a manner permitting rotation of the ball-like member so that moving the said portion of the stylus laterally relative to the longitudinal axis, in any lateral direction, causes the ball-like member to rotate and act as a fulcrum so that the stylus moves with rotation of the ball-like member, a second ball-like member located on the stylus at a position along said longitudinal axis on the opposite side of the first-mentioned ball-like member from said portion, a device having side walls laterally enclosing and in contact with said second ball-like member, planar exterior bearing surfaces on said device, and bearing means having interior bearing surfaces which engage said exterior bearing surfaces to permit relative sliding between said interior and exterior bearing surfaces, so that lateral movement of the second ball-like member in response to movement of the stylus causes corresponding lateral movement of the respective interior and exterior bearing surfaces, whereby piston valves connected to said respective bearing means are correspondingly moved.

9. Tracing mechanism mounted in a housing and adapted to reciprocate a pair of piston valves, said mechanism comprising a tracer stylus having a longitudinal axis and a ball-like member located at an intermediate position along said longitudinal axis, the stylus being mounted within the housing and having a portion extending beyond the housing, said portion being adapted to engage a pattern to be traced, means connected with the housing laterally restraining and supporting the ball-like member so that moving the said portion of the stylus laterally relative to the longitudinal axis, in any lateral direction, causes the ball-like member to rotate and act as a fulcrum so that the stylus moves with rotation of the ball-like member, a second ball-like member located on the stylus as a position along said longitudinal axis on the opposite side of the first-mentioned ball-like member from said portion, two U-shaped members, each U-shaped member comprising a bight and a pair of legs, an interior bearing surface on the inside of each leg, each of said bights having a hole therethrough which hole is generally aligned with said legs, a block having a hole therethrough, and two pairs of parallel exterior bearing surfaces on said block, said pairs of exterior bearing surfaces being perpendicular to each other and generally aligned with the hole in the block, said block being enclosed by the U-shaped members so that the holes in the bights and in the block are aligned, the bights of the U-shaped members being crossed and spaced from each other so as to hold the block between them with the interior bearing surfaces of the legs bearing against the exterior bearing surfaces of the block so as to permit relative sliding between said interior and exterior bearing surfaces, said second ball-like member being disposed in the hole in the block in contact therewith, so that lateral movement of the second ball-like member in response to movement of the stylus causes corresponding lateral movement of the respective interior and exterior bearing surfaces, whereby piston valves connected to said respective U-shaped members are correspondingly moved.

10. Tracing mechanism mounted in a housing and adapted to reciprocate a pair of piston valves, said mechanism comprising a tracer stylus having a longitudinal axis and a ball-like member located at an intermediate position along said longitudinal axis, the stylus being mounted within the housing and having a portion extending beyond the housing, said portion being adapted to engage a pattern to be traced, means connected with the housing laterally restraining and supporting the ball-like member in a manner permitting rotation of the ball-like member so that moving the said portion of the stylus laterally relative to the longitudinal axis, in any lateral direction, causes the ball-like member to rotate and act as a fulcrum so that the stylus moves with rotation of the ball-like member, a second ball-like member located on the stylus at a position along said longitudinal axis on the opposite side of the first-mentioned ball-like member from said portion, a device having side walls laterally enclosing and in contact with said second ball-like member, exterior bearing surfaces on said device which extend in the direction of desired reciprocation, and bearing means having interior bearing surfaces one of which extends in the direction of desired reciprocation, said interior bearing surfaces being in bearing relationship with the exterior bearing surfaces to permit relative movement between adjacent interior and exterior bearing surfaces in the direction of desired reciprocation so that lateral movement of the second ball-like member in response to movement of the stylus causes corresponding lateral movement of the respective interior and exterior bearing surfaces, whereby piston valves connected to said respective bearing means are correspondingly moved.

11. Tracing mechanism mounted in a housing and adapted to reciprocate a pair of piston valves, said mechanism comprising a tracer stylus having a longitudinal axis and a ball-like member located at an intermediate position along said longitudinal axis, the stylus being mounted within the housing and having a portion extending beyond the housing, said portion being adapted to engage a pattern to be traced, means connected with the housing laterally restraining and supporting the ball-like member so that moving the said portion of the stylus laterally relative to the longitudinal axis, in any lateral direction, causes the ball-like member to rotate and act as a fulcrum so that the stylus moves with rotation of the ball-like member, a second ball-like member located on the stylus at a position along said longitudinal axis on the opposite side of the first-mentioned ball-like member from said portion, two U-shaped members, each U-shaped member comprising a bight and a pair of legs, an interior bearing surface on the inside of each leg, each of said bights having a hole therethrough which hole is generally aligned with said legs, a rectangular block having a hole therethrough, and two pairs of parallel exterior bearing surfaces on said block, said pairs of exterior bearing surfaces being perpendicular to each other and generally aligned with the hole in the block, said block being enclosed by the U-shaped members so that the holes in the bights and in the block are aligned, the bights of the U-shaped members being crossed and spaced from each other so as to hold the block between them with the interior bearing surfaces of the legs in bearing relationship with the exterior bearing surfaces of the block so as to permit relative movement between said interior and exterior bearing surfaces, said second ball-like member being disposed in the hole in the block in contact therewith, so that lateral movement of the second ball-like member in response to movement of the stylus causes corresponding lateral movement of the respective interior and exterior bearing surfaces, whereby piston valves connected to said respective U-shaped members are correspondingly moved.

12. Tracing mechanism mounted in a housing and adapted to reciprocate a pair of piston valves, said mechanism comprising a tracer stylus having a longitudinal axis and a ball-like member located along said longitudinal axis, the stylus being mounted within the housing and having a portion extending beyond the housing, said portion being adapted to engage a pattern to be traced, means connected with the housing laterally restraining and supporting the ball-like member in a manner permitting rotation of the ball-like member so that moving the said portion of the stylus laterally relative to the longitudinal axis, in any lateral direction, causes the ball-like member to rotate and act as a fulcrum so that the stylus moves with rotation of the ball-like member, a second ball-like member located on the stylus at a position along said longitudinal axis spaced from the first-mentioned ball-like member, one of the ball-like members being disposed between said portion and the other of said ball-like members, a device having side walls laterally enclosing and in contact with said second ball-like member, exterior bearing surfaces on said device which extend in the direction of desired reciprocation, and bearing means having interior bearing surfaces, one of which extends in the direction of desired reciprocation, said interior bearing surfaces being in bearing relationship with the exterior bearing surfaces to permit relative movement between adjacent interior and exterior bearing surfaces, in the direction of desired reciprocation, so that lateral movement of the second ball-like member in response to movement of the stylus causes corresponding lateral movement of the respective interior and exterior bearing surfaces, whereby piston valves connected to said respective bearing means are correspondingly moved.

13. Tracing mechanism mounted in a housing and adapted to reciprocate a pair of piston valves, said mechanism comprising a tracer stylus having a longitudinal axis and a ball-like member located along said longitudinal axis, the stylus being mounted within the housing and having a portion extending beyond the housing, said portion being adapted to engage a pattern to be traced, means connected with the housing laterally restraining and supporting the ball-like member so that moving the said portion of the stylus laterally relative to the longitudinal axis, in any lateral direction, causes the ball-like member to rotate and act as a fulcrum so that the stylus moves with rotation of the ball-like member, a second ball-like member located on the stylus at a position along said longitudinal axis spaced from the first-mentioned ball-like member, one of the ball-like members being disposed between said portion and the other of said ball-like members, two U-shaped members, each U-shaped member comprising a bight and a pair of legs, an interior bearing surface on the inside of each leg, each of said bights having a hole therethrough which hole is generally aligned with said legs, a block having a hole therethrough, and two pairs of parallel exterior bearing surfaces on said block, said pairs of exterior bearing surfaces being perpendicular to each other and generally aligned with the hole in the block, said block being enclosed by the U-shaped members so that the holes in the bights and in the block are aligned, the bights of the U-shaped members being crossed and spaced from each other so as to hold the block between them with the interior bearing surfaces of the legs in bearing relationship with the exterior bearing surfaces of the block so as to permit relative movement between said interior and exterior bearing surfaces, said second ball-like member being disposed in the hole in the block in contact therewith, so that lateral movement of the second ball-like member in response to movement of the stylus causes corresponding lateral movement of the respective interior and exterior bearing surfaces, whereby piston valves connected to said respective U-shaped members are correspondingly moved.

14. Tracing mechanism mounted in a housing and adapted to reciprocate a pair of piston valves, said mechanism comprising a tracer stylus having a longitudinal axis and a ball-like member located at an intermediate position along said longitudinal axis, the stylus being mounted within the housing and having a portion extending beyond the housing, said portion being adapted to engage a pattern to be traced, means connected with the housing laterally restraining and supporting the ball-like member in a manner permitting rotation of the ball-like member so that moving the said portion of the stylus laterally relative to the longitudinal axis, in any lateral direction, causes the ball-like member to rotate and act as a fulcrum so that the stylus moves with rotation of the ball-like member, a second ball-like member located on the stylus at a position along said longitudinal axis on the opposite side of the first-mentioned ball-like member from said portion, a device having side walls laterally enclosing and in contact with said second ball-like member, exterior bearing surfaces on said device, and bearing means having interior bearing surfaces which engage said exterior bearing surfaces to permit relative sliding between said interior and exterior bearing surfaces, so that lateral movement of the second ball-like member in response to movement of the stylus causes corresponding lateral movement of the respective interior and exterior bearing surfaces, whereby piston valves connected to said respective bearing means are correspondingly moved.

15. Tracing mechanism mounted in a housing and adapted to reciprocate a pair of piston valves, said mechanism comprising a tracer stylus having a longitudinal axis and a ball-like member located at an intermediate position along said longitudinal axis, the stylus being mounted within the housing and having a portion extending beyond the housing, said portion being adapted to engage a pattern to be traced, means connected with the housing laterally restraining and supporting the ball-like member in a manner permitting rotation of the ball-like member so that moving the said portion of the stylus laterally relative to the longitudinal axis, in any lateral direction, causes the ball-like member to rotate and act as a fulcrum so that the stylus moves with rotation of the ball-like member, a second ball-like member located on the stylus at a position along said longitudinal axis on the opposite side of the first-mentioned ball-like member from said portion, a device having side walls laterally enclosing and in contact with said second ball-like member, exterior bearing surfaces on said device, and bearing means having interior bearing surfaces which are in bearing relationship with said exterior bearing surfaces to permit relative movement between adjacent interior and exterior bearing surfaces, so that lateral movement of the second ball-like member in response to movement of the stylus causes corresponding lateral movement of the respective interior and exterior bearing surfaces, whereby piston valves connected to said respective bearing means are correspondingly moved.

16. Tracing mechanism mounted in a housing and adapted to reciprocate a pair of piston valves, said mechanism comprising a tracer stylus having a longitudinal axis and a ball-like member located along said longitudinal axis, the stylus being mounted within the housing and having a portion extending beyond the housing, said portion being adapted to engage a pattern to be traced, means connected with the housing laterally restraining and supporting the ball-like member in a manner permitting rotation of the ball-like member so that moving the said portion of the stylus laterally relative to the longitudinal axis, in any lateral direction, causes the ball-like member to rotate and act as a fulcrum so that the stylus moves with rotation of the ball-like member, a second ball-like member located on the stylus at a position along said longitudinal axis spaced from the first-mentioned ball-like member, one of the ball-like members being disposed between said portion and the other of said ball-like members, a device having side walls laterally enclosing and in contact with said second ball-like member, exterior bearing surfaces on said device, and bearing means having interior bearing surfaces which are in bearing relationship with said exterior bearing surfaces to permit relative movement between adjacent interior and exterior bearing surfaces, so that lateral movement of the second ball-like member in response to movement of the stylus causes corresponding lateral movement of the respective interior and exterior bearing surfaces, whereby piston valves connected to said respective bearing means are correspondingly moved.

17. A tracer mechanism according to claim 16, in which means permitting rapid traverse of the stylus is associated with the stylus, said means comprising a non-planar surface at the top of the stylus, and a pin located above the stylus and having an axis collinear with said longitudinal axis, a head on said pin having a mating non-planar surface spaced from the first mentioned non-planar surface to limit movement of the stylus, and means for retracting the pin to allow greater movement of the stylus for rapid traverse.

18. A tracer mechanism according to claim 16 in which means permitting rapid traverse of the stylus is associated with the stylus, said means comprising a non-planar surface of revolution at the top of the stylus, and a pin located above the stylus and having an axis collinear with said longitudinal axis, a head on said pin having a mating non-planar surface of revolution spaced from the first mentioned non-planar surface of revolution to limit movement of the stylus, and means for retracting the pin to allow greater movement of the stylus for rapid traverse.

References Cited in the file of this patent

UNITED STATES PATENTS

| | | |
|---|---|---|
| 1,542,259 | Macy | June 16, 1925 |
| 1,557,214 | McClane | Oct. 13, 1925 |
| 2,079,720 | Shaw | May 11, 1937 |
| 2,144,616 | Carlson | Jan. 24, 1939 |
| 2,239,625 | Roehm | Apr. 22, 1941 |
| 2,332,532 | Roehm | Oct. 26, 1943 |
| 2,337,166 | Overbeke | Dec. 21, 1943 |